UNITED STATES PATENT OFFICE.

W. J. CANTELO, OF PHILADELPHIA, PENNSYLVANIA.

IMPROVEMENT IN THE APPLICATION OF THE HIBISCUS MOSCHENTOS TO THE MANUFACTURE OF PAPER AND OTHER PURPOSES.

Specification forming part of Letters Patent No. 35,215, dated May 13, 1862.

*To all whom it may concern:*

Be it known that I, WM. J. CANTELO, of Philadelphia, Pennsylvania, have invented or discovered the Application of the Fibers of the Hibiscus Moschentos to the Manufacture of Paper, Cordage, Textile Fabrics, &c.; and I do hereby declare the following to be a full, clear, and exact description of my said invention or discovery, and of the manner in which the same may be carried into effect.

The plant whose fibers I have discovered to be applicable to the manufacture of cordage, paper, textile fabrics, &c., is known by the botanic term of *Hibiscus moschentos,* order *Malvaceæ.* It has also been termed the *Hibiscus palustris.* The plant which has been hitherto deemed a useless weed is found in abundance in all the Northern States, and especially in the State of New Jersey, the stalks, when full grown, varying from five to eight feet high, and from three-eighths to five-eighths of an inch in diameter near the root. Each stalk consists of a central core of pith surrounded by a thin skin of ligneous matter, which is inclosed within a thin covering of fibers of extraordinary strength. It is these fibers which I apply to the above-mentioned manufactures. During the month of October, when the seeds are ripe or nearly ripe, I cut down the stalks nearly to the ground, and deprive them of the seed-pods and leaves. I take these stalks and crush them by passing them between rollers or by submitting them to any machine capable of accomplishing the same result. The ligneous matter and pith of the stalks are thus broken, at the same time the exterior of the fiber is split and disintegrated to such an extent as to allow the wood and pith to escape on simply shaking the crushed stalks. The fibers are now in a proper condition for being formed into coarse matting, and after the fibers have been properly hackled they are in a condition for being converted into rope, cordage, sacking, &c. When the fibers have to be used for papermaking they are passed, in their crude state, directly into boiling water which contains quicklime, about two ounces of the latter material being used for every pound of fiber, which is boiled for from six to twelve hours. After this, soda-ash is added to the boiling water, in the proportion of one ounce of soda-ash to one pound of fiber, which is again boiled for a period of from six to twelve hours. The fibers are then removed and well washed in a stream of clear water, and subsequently steeped for about twenty-four hours in cold water containing three-quarters of a pound, or thereabout, of chloride of lime to every pound of fiber, when the latter will be so far bleached as to be ready to submit to an ordinary ragmill for conversion into paper-pulp.

I claim as my invention or discovery—

The application of the fibers of the American plant known as the *Hibiscus moschentos* or *Hibiscus palustris* to the manufacture of paper, cordage, textile fabrics, &c., as herein set forth.

In testimony whereof I have signed my name to this specification in the presence of two subscribing witnesses.

W. J. CANTELO.

Witnesses:
   HENRY HOWSON,
   CHARLES E. FOSTER.